Dec. 8, 1925.  1,564,216
J. A. DOANE
AUTOMATIC FORMING LATHE
Filed July 1, 1922   6 Sheets-Sheet 2

Inventor
John A. Doane,
By Joseph F. Schofield
Attorney

Dec. 8, 1925.

J. A. DOANE 1,564,216

AUTOMATIC FORMING LATHE

Filed July 1, 1922     6 Sheets-Sheet 6

Inventor
John A. Doane,
By Joseph K. Schofield
Attorney

Patented Dec. 8, 1925.

1,564,216

UNITED STATES PATENT OFFICE.

JOHN A. DOANE, OF HARTFORD, CONNECTICUT, ASSIGNOR TO PRATT & WHITNEY COMPANY, OF NEW YORK, N. Y., A CORPORATION OF NEW JERSEY.

AUTOMATIC FORMING LATHE.

Application filed July 1, 1922. Serial No. 572,140.

To all whom it may concern:

Be it known that I, JOHN A. DOANE, a citizen of the United States, residing at Hartford, in the county of Hartford and State of Connecticut, have invented certain new and useful Improvements in Automatic Forming Lathes, of which the following is a specification.

This invention relates to lathes and particularly to a lathe having a single work supporting and rotating spindle and a plurality of tools adapted to either simultaneously or successively engage a work blank mounted on the single work spindle.

It is an object of the present invention to provide a lathe adapted to complete a plurality of operations on different surfaces of a single blank while mounted in operative position in the lathe, some of the tools operating simultaneously and others adapted to complete their operation on the work blank after the first tools have completed their operation.

A principal object of the present invention is to provide a lathe adapted to work upon and completely finish the outside surfaces of a piston of trunk form such as normally used in automobiles or other single acting internal combustion engines.

Another object of the invention is to provide a special tool operated in a unique manner to relieve or cut away the cylindrical surface of the piston adjacent the wrist pin holes, that is, upon two diametrically opposite parts of the cylindrical surface of the work. This mechanism is adapted to be operated by means driven from a cam shaft separate from the other tool operating means and rotating at the same speed as the work spindle. A drum on this cam shaft is provided with a diametrical slot through which a member may slide, the length of the member being slightly greater than the diameter of the drum so that one end or the other of the member extends beyond the periphery of the drum. A roller operating closely adjacent and movable toward the drum causes the member to extend more and more from the upper portion of the drum at each half revolution and this member, when so extended, oscillates a tool carrying arm so that the tool is forced radially toward the work twice during each revolution to relieve portions adjacent the wrist pin holes.

Another object of the invention is to provide an oscillating tool adapted to face the end surface of the work being operated on. Preferably two tools are provided one just above the other. One of these may be used for rough facing and the other, namely, the lower one, for finishing this radial surface.

With these and other objects in view, my invention consists in the features of construction and operation set forth in the following specification and illustrated in the accompanying drawings.

In the accompanying drawings annexed hereto and forming a part of this specification, I have shown my invention embodied in a piston finishing machine, but it will be understood that the invention can be otherwise embodied and that the drawings are not to be construed as defining or limiting the scope of the invention, the claims appended to this specification being relied upon for that purpose.

In the above mentioned drawings, I have shown but one modification of the invention which is now deemed preferable but it is to be understood that changes and modifications may be made within the scope of the appended claims without departing from the spirit of the invention.

Briefly, my invention in its broadest aspect comprises the following principal parts: First, a base; second, a headstock having a single work supporting and rotating spindle therein; third, a radially operating tool support adapted to have fixed thereon a plurality of cutting tools which may be oscillated towards the axis of rotation of the work; fourth, another cutting tool adapted periodically to be given a relieving action radially toward and from the axis of rotation of the work to suitably relieve portions of the cylindrical surface being turned; fifth, a formed facing tool adapted to operate upon an end face of the work; sixth, cam operated means to operate the tools in a definite predetermined cycle; seventh, throw-out means to disengage the driving means for the machine after the completion of a cycle of operations; and eighth, a steady rest adapted to contact with a surface of the work while being operated on.

Referring more specifically to the figures of the drawings, I provide a base 10 having near one end a headstock 11 in which a rotatable work supporting spindle 12 may be provided extending horizontally and longitudinally along the base. This spindle and its supports are clearly shown in section in Fig. 3. As the spindle 12 is mounted in the headstock 11 in the usual manner, further description is thought unnecessary.

To drive this work spindle 12, I provide a pulley 13 in rear of the headstock 11 which may be driven by any convenient source of power. This pulley 13 is adapted to be placed in driving connection with a forwardly extending horizontal shaft 14 by means of the friction clutch 15 shown in section in Fig. 2. On this forwardly extending shaft 14, I provide a worm 16 which may be formed integrally therewith and which is in driving connection with a worm wheel 17 fastened directly to the work spindle.

As the driving clutch 15 is of conventional form, further description is thought to be unnecessary. In order to operate the driving clutch 15 to rotate this worm shaft 14, I provide a rod 18 extending forwardly through the center of this worm shaft 14 and, on the forward vertical surface of the lathe, I mount a hand operating lever 20 which may be oscillated to move a yoke member 21 forward or rearward. This yoke member is provided with projections which engage a circular groove in a member 22 secured to the forward end of this rod 18. It will be seen, therefore, that by oscillating the hand lever 20 the control rod 18 may be moved forward and thus the driving clutch 15 will be thrown into operative position to drive the lathe. I also provide means for automatically disengaging the clutch 15 as soon as the cycle of operations has been completed. This mechanism will presently be described.

Figure 3:
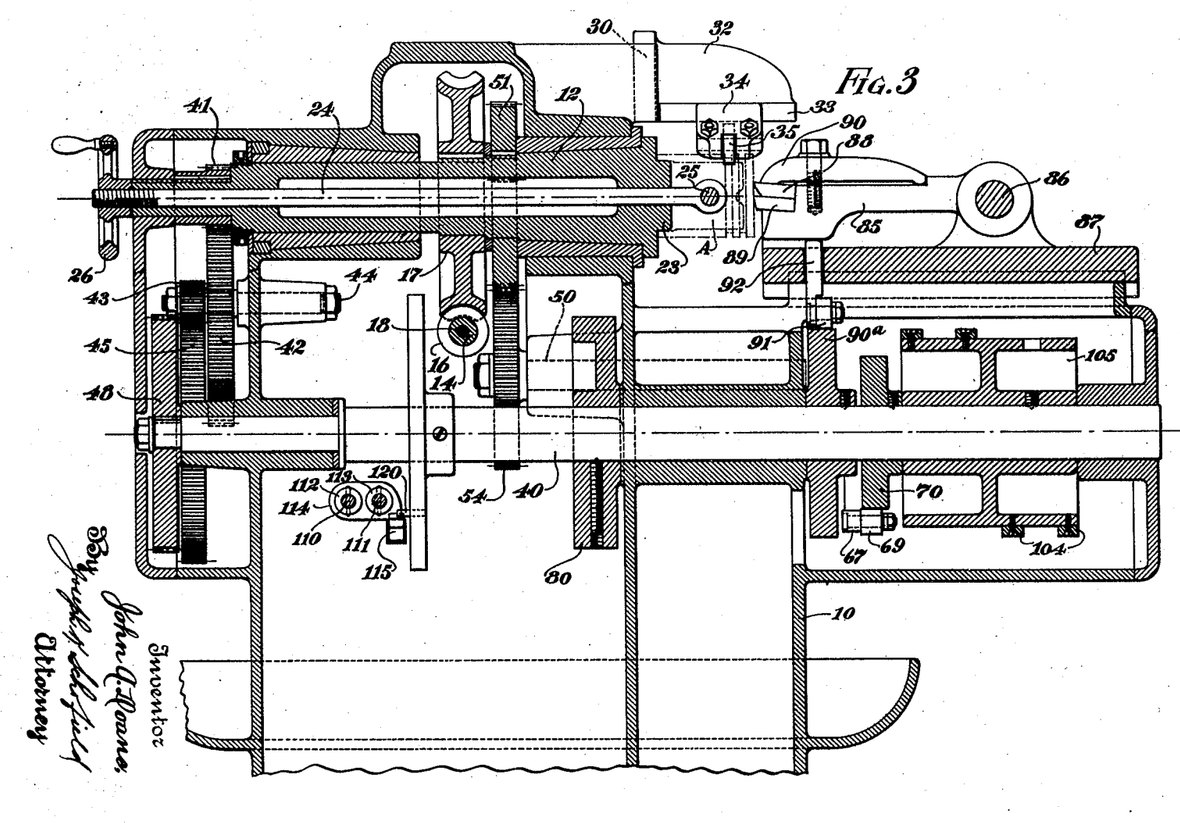
Fig. 3 is a central longitudinal section of the complete machine.

In the embodiment of the invention selected for illustration, the lathe is shown operating upon a trunk piston of automobile type and I therefore provide special means for mounting this type of work blank on the work supporting and rotating spindle 12. As shown in Fig. 3, the work engaging end of the spindle 12 is provided with a cylindrical projection 23, this being of such a size that the piston A to be operated on may fit firmly thereover coaxially with the work spindle 12. A tie-rod 24 extends at one end far enough that it may be engaged by a transverse pin 25 passed through the wrist pin holes of the piston A. For this purpose the tie-rod is provided with a transversely extending hole. The opposite end of this tie-rod 24 is threaded and is adapted to be engaged by a freely rotatable hand wheel 26 in threaded connection therewith. It will be seen from this construction that with a piston A placed in position on the work spindle 12 and with a transverse pin 25 extending through the wrist pin holes of the piston blank and through the eye or transverse hole in the end of the tie-rod 24, the hand wheel 26 may be rotated thus moving the tie-rod 24 to firmly hold the piston A against the face of the spindle 12, the hand wheel 26 being drawn into contact with the opposite end of the work spindle. To remove the work, it is only necessary to slightly loosen the hand wheel 26 and remove the transverse pin 25 from the wrist pin holes of the piston A.

As I preferably operate a plurality of tools simultaneously upon the work A, I provide a steady rest 30 which may engage a concentric cylindrical surface of the work. For this purpose, I provide vertical ways 31 at the right end face of the headstock 11 in which I adjustably fix an over-hanging arm 32. On the over-hanging arm 32 I provide guideways 33 extending horizontally in a position directly over the work A. On these ways 33, I mount and adjustably clamp a block 34 having a pair of rollers 35 thereon. By suitably positioning and clamping the over-hanging arm 32 on the ways 31 on the headstock 11 and also clamping the block 34 on the ways 33 on the arm 32, the rollers 35 may be so adjusted that they contact with a cylindrical surface of any diameter of work being operated upon and thus hold the work against deflection due to the thrust of the various tools.

In order to actuate the tools so that they may operate on the work and be fed radially or axially thereof, I provide a main cam shaft 40, the cams on this shaft 40 being provided with surfaces contacting with tool operating levers by means of which the tools are actuated. To rotate this cam shaft 40 at a slow speed relative to the work spindle 12, I provide a driving pinion 41 keyed to the work spindle 12 near one end. In mesh with this pinion is a large gear 42 having a pinion 43 directly fixed thereto. These two gears 42 and 43 are rotatably mounted on a stud 44 fixed in the base 10 of the machine. Contacting with the pinion 43 on this stud 44 is another gear 45 also fixed directly to a second gear 46, these latter two gears being on a second stud 47 on the base 10 and contacting with the smaller of these latter gears is a gear 48 mounted at one end of the cam shaft 40.

One of the tools used in this lathe to be presently referred to is actuated by a separate shaft 50 which is driven directly from and at the same rotative speed as the work spindle 12. To rotate this second cam shaft 50, a gear 51 is fixed to the work spindle 12 preferably adjacent the driving worm gear 17 and which is in mesh with an idler gear 52 on a stud 53, this gear being in mesh with a gear 54 on the second or auxiliary cam shaft 50. The ratio of these gears on the work spindle 12 and second cam shaft 50 is one to one, so that second cam shaft 50 therefore rotates at the same rotative speed and in the same direction as the work spindle 12.

The tool referred to in the preceding paragraph and actuated by the auxiliary cam shaft 50 is provided for the purpose of relieving or cutting away portions of the cylindrical surface of the piston A adjacent the wrist pin holes. In use and particularly in automobile engines the area of the pistons adjacent these wrist pin holes is apt to be forced outwardly a slight amount which might interfere seriously with the proper functioning of the piston within the cylinder. By recessing slightly or relieving this part of the surface of the piston subsequent enlargement does not enlarge the diameter beyond the proper or normal diameter of the piston. This tool 55 I mount adjustably on an arm 56 so that it is adapted to oscillate about or with a shaft 57 fixed longitudinally and horizontally at one side of the headstock 11. Preferably this arm 56 is made in two parts as shown so that the two arms may be separated or brought together slightly and clamped in adjusted position. This two part construction is clearly shown in Fig. 5, a second arm 58 being mounted on the shaft 57. Preferably an adjusting screw 59 is threaded into a lug 60 on one member 56 and in such a position that it may bear against the other member 58. Adjustment of this screw 59 permits ready adjustment of the tool carrying arm 56, relative to the arm 58. A locking bolt 60 may also be provided to aid in maintaining the adjustment of these two arms 56 and 58. The second arm 58 of this actuating member for the relieving tool 55 carries at its lower end a roller 61 which is adapted to contact with the periphery of a small drum 62 on the second or auxiliary cam shaft 50. Extending through a diametral slot 63 in this drum is a member 64 in the form of a rod or bar slightly longer than the diameter of the drum 62. The ends of the member 64 are curved to correspond substantially with the curvature of the drum. This bar 64 is free to slide back and forth within the drum 62 and is preferably provided with a short slot 65 through which a pin fastened to the drum may extend to prevent extreme movement. Mounted on another stud or shaft 66 adjacent the second cam shaft 50 is a lever 67 adapted to oscillate, the upper and shorter end of which is provided with a roller 68 adapted to oscillate closely adjacent the drum 62 and the sliding bar 64 extending therethrough. The longer and lower end of this lever 67 which may have a roller 69 thereon is adapted to contact with a cam 70 of spiral form mounted on the main cam shaft 40.

As the work spindle 12 and the second cam shaft 50 rotate at the same angular speed, it will be seen that with each revolution of the work A and of the second cam shaft 50, the roller 61 on the oscillating tool arm 58 will contact with the bar 64 extending through the drum 62 at each half revolution of the drum 62 when one end of the bar 64 protrudes above the surface of the drum. The amount this bar 64 may extend above the cylindrical surface of the drum 62 is controlled by the oscillating lever 67 contacting with the spiral cam 70 on the main cam shaft 40. When the work A is first started to rotate the cam 70 on the main cam shaft 40 holds the oscillating lever 67 in such a position that the distance between its roller 68 and the roller 61 on the tool arm 58 is approximately equal to the length of the bar 64, therefore the tool arm 58 and the tool 55 are not oscillated and the roller 61 on the tool arm 58 rides on the periphery of the drum 62. However, as the main cam shaft 40 rotates it very slightly oscillates the lever 67 in accordance with the increasing diameter of the spiral cam 70 and therefore forces the bar 64 to be extended slidably through the drum 62 more and more at each half revolution of the drum 62. Thus the bar 64 slides back and forth to opposite sides of the drum 62 as this drum 62 rotates and also brings the bar 64 into contact with the roller 68 on the lever 67. It will be seen therefore that after the oscillating lever 67 has been oscillated by the spiral cam 70 to such a position that the bar 64 is forced materially outwardly from the drum 62 then when this bar passes beneath the roller 61 on the tool arm 58, this tool arm 58 will have a slight oscillatory movement and will advance the tool 55 radially toward and from the axis of rotation of the work. This movement also becomes increasingly greater as the angular position of the oscillating lever 67 continues to change and as the movement of the rod 64 through the drum is increased. It will therefore be seen that with each half revolution of the second cam shaft 50 and also of the work spindle 12, the bar 64 will be moved diametrically through the drum 62 a short distance and therefore the tool 55 on the tool arm 57 will have two complete oscillatory movements for each complete revolution of the work A. This tool 55 is used exclusively to relieve diametrically opposite parts of the cylindrical surface of the piston A adjacent its wrist pin holes and the width of this relieved portion is governed by the type of formed tool 55 adjustably secured in the arm 57. In setting up the work on the spindle 12 it must be so placed that the relieved portions will be in proper position relation to the wrist pin holes.

Figure 5:
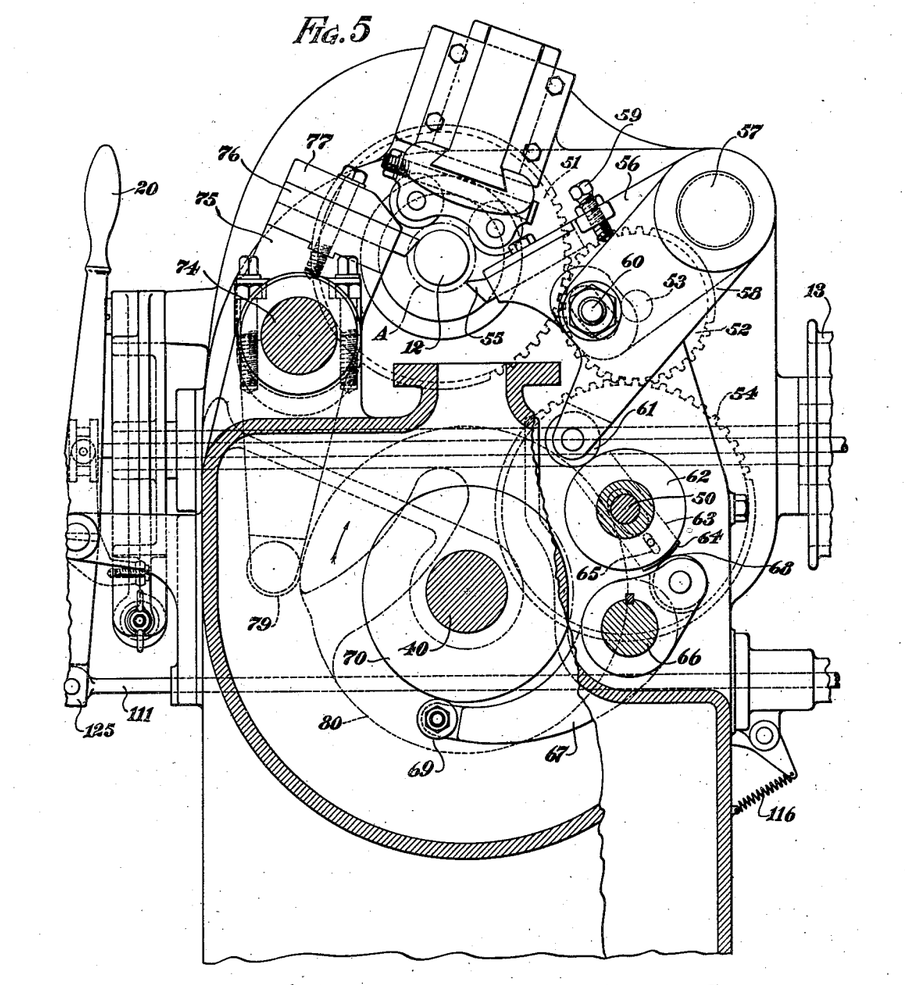
Fig. 5 is an end view partly in section taken from the opposite end of the machine.

A second oscillatory tool support 75 is also provided in which may be adjustably supported one or more tools 76 adapted to cut ring grooves or, if these grooves previously have been roughed out, then this tool support 75 may be used for tools to accurately finish their opposite radial faces. This tool support 75 comprises a lever adapted to oscillate about a short shaft 74 extending horizontally and longitudinally of the base. The upper end of the support 75 is provided with adjustable tool clamping means 77 and is secured to shaft 74 as shown in Fig. 5. The lower end of a lever 78 also secured to shaft 74 is provided with a roller 79 adapted to contact with a second peripheral cam 80 on the main cam shaft 40. It will be seen therefore that with the slow rotation of the main cam shaft 40 this oscillating lever 75 readily advances its tools 76 toward and from the work A in accordance with the varying diameter of its periphery.

As this tool support 75 is directly in front of the work A as shown in Fig. 5 and would seriously interfere while in operative position with the removal of the finished blank and placing of a new blank on the work spindle 12, I provide means for permitting an extreme oscillation of this lever away from the work A so that the operator may have ready access to the work and work spindle 12. For this purpose, I provide a recess 81 of arcuate form in the side of the cam 80 by means of which this lever 75 is oscillated. The position of this recess 81 is such that when the cam shaft 40 is in the position assumed when the work blank A is to be changed, the recess is directly in alignment with the roller 79 on the lower end of this oscillating lever 75. It will be seen therefore that when the cam shaft 40 is in this position the operator can manually oscillate the lever 75 so that the tools 76 are removed radially from the work A and thus permit access thereto. It will also be seen that the recess 81 is of such form that when the machine is again started the roller 79 will engage one arcuate surface of this recess 81 which will positively advance the tools 76 into operative position relative to the work.

Figure 1:
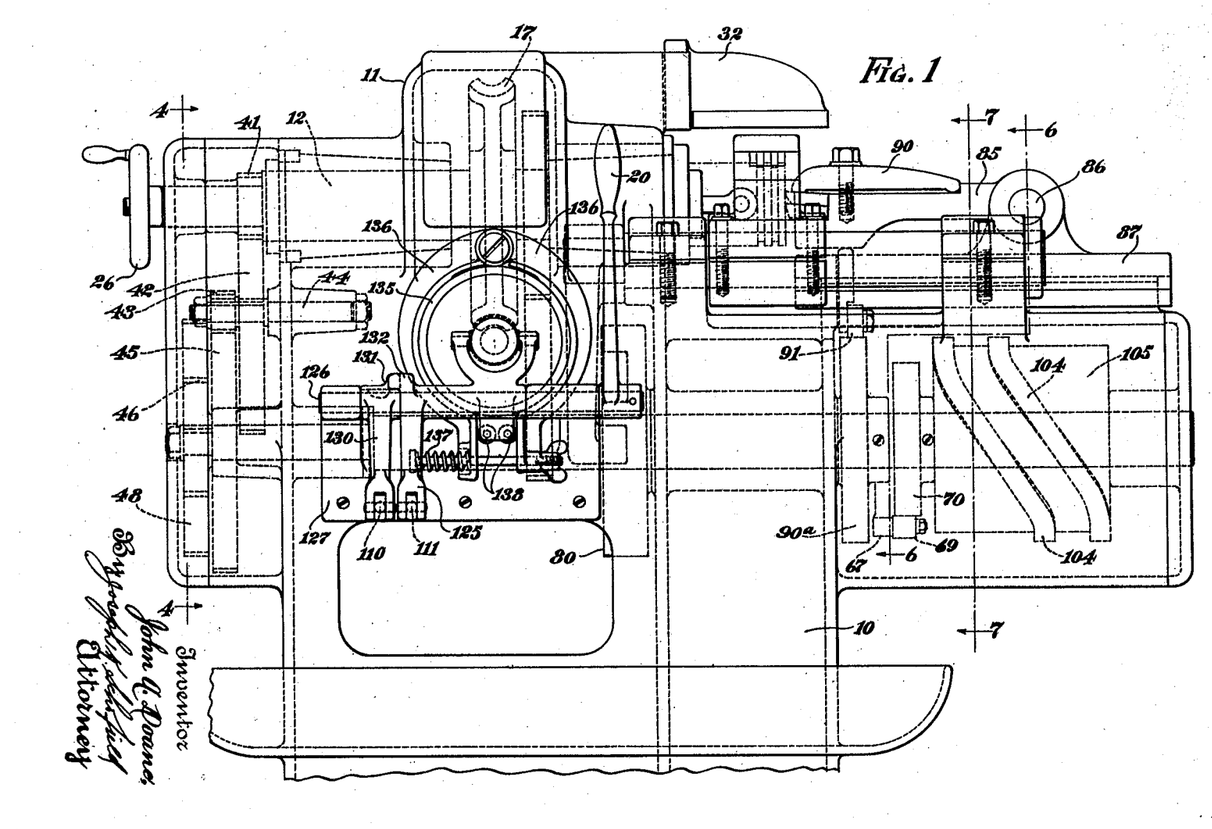
Figure 1 is a front elevation of the complete machine.

In order to finish the end face of the piston or other blank A being operated on, I mount an oscillating tool supporting member 85 about a short horizontally mounted transverse stud 86 fixed within a tool carriage 87 adjustably clamped upon ways provided on the base 10 and extending longitudinally thereon. This supporting member 85 at its free end is provided with a tool 88 of any desired form depending upon the form desired for the end face of the blank. Preferably, and as shown in Figs. 1 and 3, I provide two tools 88 and 89 mounted one directly above the other and clamped in position as shown. These tools 88 and 89 have their cutting edges on the free outer edges or surfaces of the two superposed plates held in place by the same clamping means 90. The upper tool plate 88 may be suitably formed to provide a roughing tool and the lower plate 89 so formed that it provides a finishing tool. To oscillate this tool supporting member 85 vertically to move the tools 88 and 89 into and past operative position, a third peripheral cam 90$^a$ is provided on the main cam shaft which is engaged by a roller 91 on a vertically positioned stud 92 or projection slidably mounted and extending through the carriage 87. The upper end of this stud 92 contacts with the lower surface of the tool supporting member 85. It will be seen from the above that with rotation of the shaft 40 this cam 90, which may be of spiral form on its periphery, will slowly elevate the stud 92 and therefore oscillate the tool member 85. This movement will first bring the upper or roughing tool 88 into operation with the end face of the work A, and, after the support 85 has reached approximately a horizontal position will bring the lower or finishing tool 89 into position. After the finishing tool 89 has completed its operation the tool supporting member 85 may be lowered to its initial position by continued rotation of this cam 90 and cam shaft 40.

Figure 6:
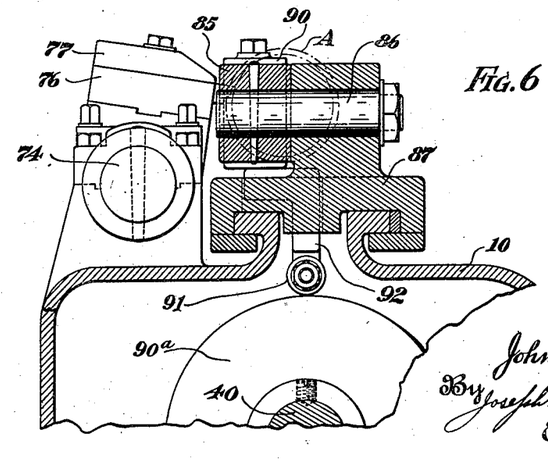
Fig. 6 is a vertical sectional view taken on line 6—6 of Fig. 2.
Figure 7:
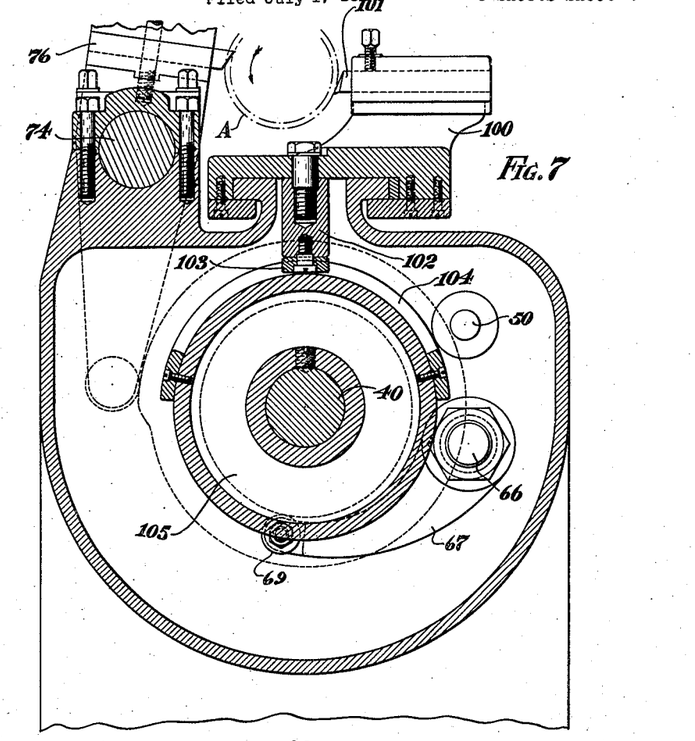
Fig. 7 is a vertical sectional view taken on line 7—7 of Fig. 2, a turning tool being substituted for the facing tool.

As it may sometimes be of advantage to provide a plain turning tool as a part of the equipment to permit the machine to operate on more widely differing types of articles, I provide a small tool carriage 100 which may be secured to the ways on the base 10 as shown in Fig. 6. This preferably has its tool 101 positioned in rear of the blank A and therefore its position is reversed as shown in this figure. This tool carriage 101 is operated by a stud 102 fixed thereto on its lower surface which carries on its lower surface a small roller 103. This roller 103 engages the surfaces of helical cam strips 104 mounted on the periphery of a cam drum 105 mounted on the main cam shaft 40. This cam drum 105 is clearly shown in dotted lines in Figs. 1 and 3. By adjusting the positions of the cam strips 104 different lengths of movement may be given to this tool carriage 100.

Figure 2:
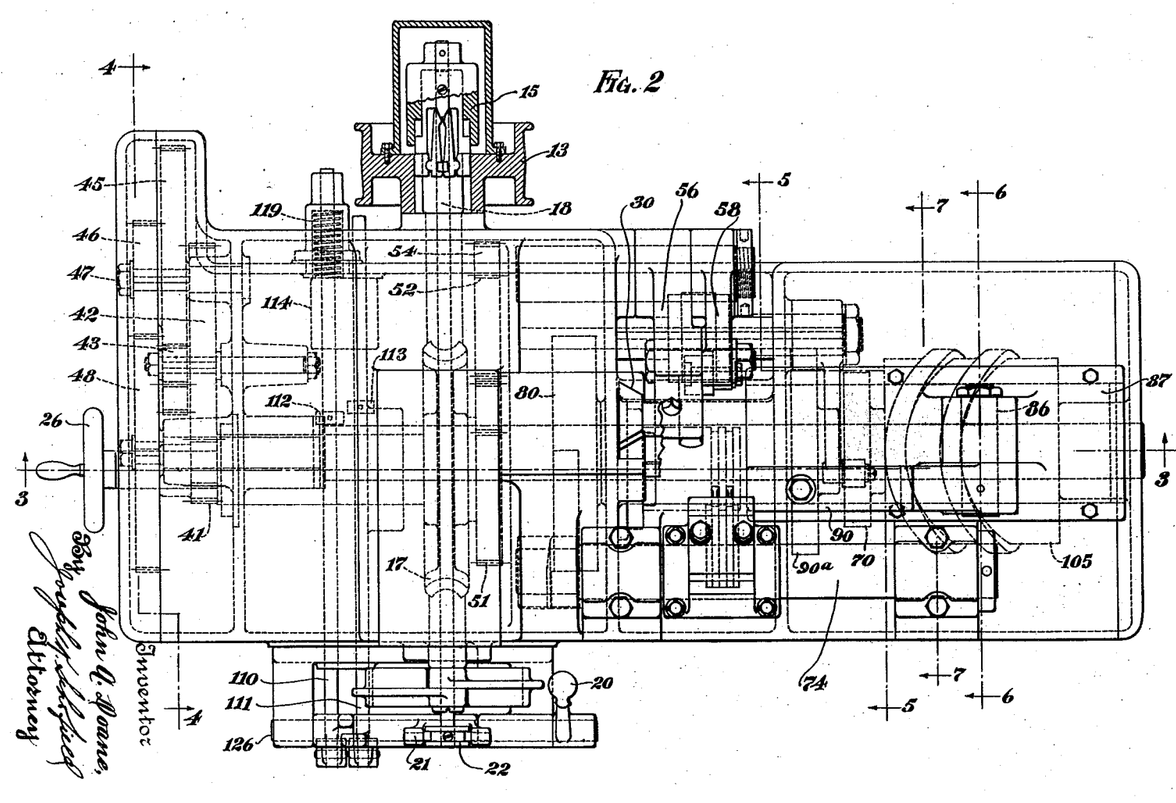
Fig. 2 is a plan view of the complete machine.
Figure 4:
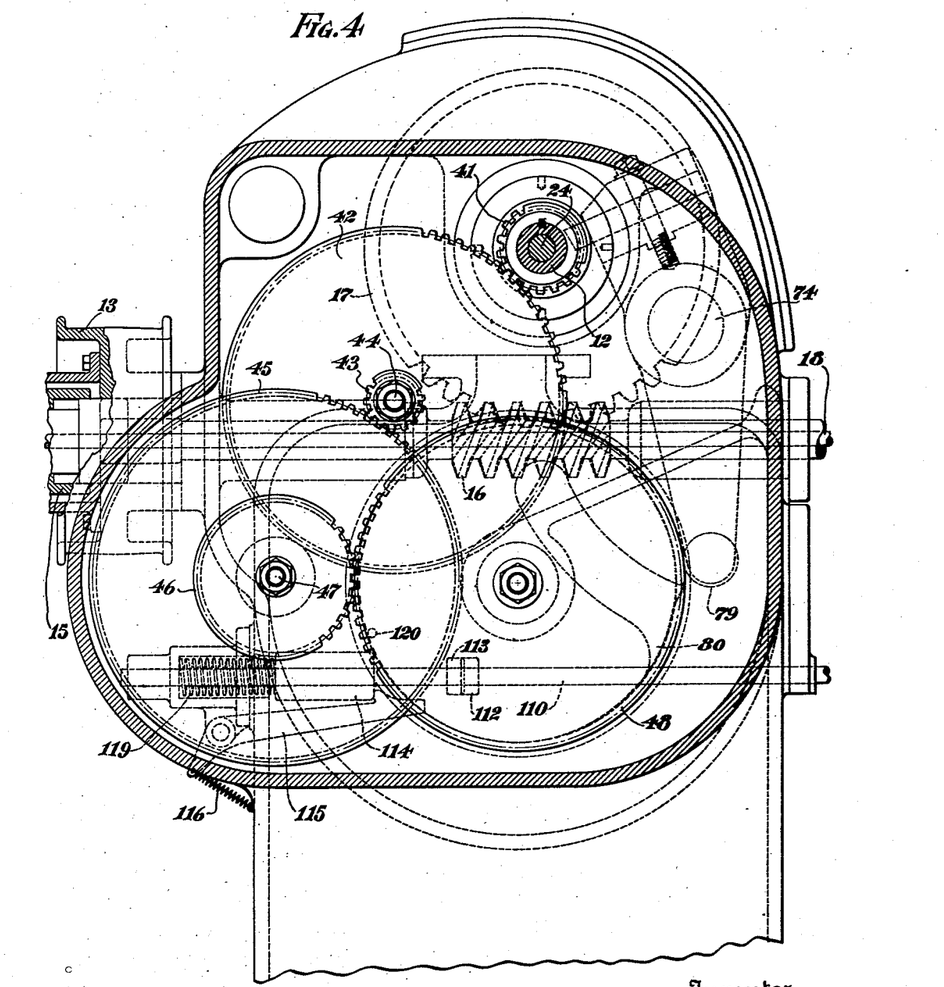
Fig. 4 is an end elevation taken from the head-end of the machine on line 4—4 of Fig. 2.

Special means are provided for automatically stopping further operation of the lathe after a cycle of operations has been completed and these are preferably operated by rotation of the main cam shaft 40, one revolution of which completes a cycle of operations. As shown in Fig. 2 in dotted lines two horizontal forwardly extending rods 110 and 111 are provided on which are respectively fixed small collars 112 and 113. Slidably mounted on these two rods 110 and 111 is a weight 114, which, during operation of the machine, is held in its rearward position by means of a latch 115 shown in Fig. 4. This latch 115 as shown is mounted so that it may oscillate in a vertical plane. Normally it is held in its upper position to be engaged by the weight or plunger 114 by a coiled spring 116. In order to set this weight or plunger 114 in its retracted position, the operating lever 20 previously referred to is oscillated in a forward direction to engage the main driving clutch 15, this also moves both of the rods 110 and 111 rearwardly. The collar on the rod 110 contacts with the forward surface of the weight and forces it rearwardly until the spring held latch 115 holds it in its rearward position against the coiled spring 119 surrounding the rod 110. As soon as operation on the work blank A has been completed a pin 120 (see Fig. 4) mounted on the face of a member on the main cam shaft contacts with the outer free end of this latch 115 thus depressing it and permitting the weight or plunger 114 to be forced suddenly forward by the coil spring 119. This plunger 114 then strikes against the collar 113 on the second rod 111 and forces it forward. This rod 111 is fixed to a lower extension of an oscillating member 125 to which the yoke 21 above mentioned is fastened. This movement of the rod therefore oscillates the yoke 21 and moves the clutch rod 18 rearwardly and disengages the clutch 15 thus stopping further rotation of the main driving shaft 14 and the operative parts of the lathe.

As shown most clearly in Fig. 1, the rods 110 and 111 previously mentioned are pivotally attached respectively to oscillating members 130 and 125 which may pivot about or with a horizontal longitudinally extending shaft 126. Preferably, this shaft 126 is mounted on a bracket 127 outstanding from the forward vertical surface of the base 10. The oscillating member 130 together with the first rod 110 around which the plunger spring 119 is mounted is directly keyed to the oscillating shaft 126. Also keyed to this oscillating shaft 126 is the operating lever 20 above referred to. It will be seen, therefore, that this operating lever 20 when moved forward and downward forces the rod 110 backward together with its collar 112 and thus moves the weight or plunger 114 far enough back to be engaged and retained in retracted position by the latch 115.

The oscillating member 130 carries a slight projection 131 which is engaged by an interengaging projection 132 on the oscillating member 125 which carries the clutch operating yoke 21. This oscillating member preferably is in the form of a sleeve loosely surrounding the operating lever shaft 126. These projections 131 and 132 are so placed that the forward movement of the operating lever 20 and its oscillating member 130 also oscillates the yoke 21 on the second oscillating member 125 so that with each forward movement of the operating lever 20 the yoke member 21 is oscillated to move forward the clutch rod 18 and throw the driving clutch 15 into operative position.

As soon as the lever 20 has been moved to throw the driving clutch 15 into operative position and to load the weight 114, that is, to force it backward against the force of the coiled spring 119 to be retained by the latch 115, the operating lever 20, the oscillating member 130 attached thereto, and the first rod 110 may be moved back again to their original position without interfering with the position of the driving clutch 15 or its operating rod 18 and yoke member 21. As soon as the cycle of operations of the machine has been completed and the pin 120 on a member on the cam shaft 40 has disengaged the latch 115 from the forward face of the weight or plunger 114, it is forced forwardly by expansion of the coiled spring 119 surrounding the rod 110. The plunger 114 then strikes the collar 113 on the second rod 111 with considerable force sufficient to oscillate the member 125 on operating lever shaft 126 and the yoke member 21 to disengage the driving clutch 15.

In order to assure prompt stopping of the main driving shaft 14 so that the main cam shaft 40 may always be stopped in approximately the same position, I mount a drum 135 on the forward end of the main driving shaft 14 and provide in position to surround this drum 135, two semi-circular hinged brake members 136, the free ends of these brake members 136 being resiliently forced together by a coil spring 137. While the machine is in operation, these brake members 136 are forced apart by rollers 138 preferably mounted on an extension of the yoke member 21 interposed between the brake bands 136 thus permitting free rotation of the driving shaft 14 and drum 135. As soon as the main driving clutch 15 has been disengaged the rollers 138 on the yoke member 21 between the extensions of these two brake members 136 are withdrawn thus permitting the brake members 136 to be tightly engaged with the drum 135 and thus serve to promptly stop further rotation of the main driving shaft 14. This enables the operator to automatically stop the operation of the lathe in a position to readily remove the transverse locking pin 25 from the wrist pin holes of the work blank A and replace a new blank in operative position. To stop the lathe at any other time, any usual means, as for instance, stopping rotation of the main driving pulley 13, may be used.

To again start operation of the machine, it is only necessary to again move the operating lever 20 forward and downward which again places the plunger or weight 114 in its rearward position in which place it is held by the latch 115, and, upon again completing operation of the machine, the weight 114 is disengaged from its retracted position and the driving clutch 15 is again disengaged by oscillation of the yoke member 21.

What I claim is:

1. A lathe comprising in combination, a base, a work supporting and rotating spindle thereon, a plurality of tools adapted to engage and operate on work mounted on said spindle, cam means mounted on a main cam shaft to control the movements of said tools, a starting lever for the lathe adapted to engage a driving clutch, automatically operating mechanism to stop operation of said lathe when each of the tools has completed its operation, said mechanism comprising a spring pressed plunger adapted to be released by means on the main cam shaft and adapted to disengage the driving clutch and engage a brake member.

2. A lathe comprising in combination, a base, a work supporting and rotating spindle thereon, a tool adapted to relieve portions of a cylindrical surface on work mounted on said spindle, means to actuate said tool radially twice during each revolution of said work, and means to successively advance said tool radially with each revolution of the work spindle.

3. A lathe comprising in combination, a base, a work supporting and rotating spindle thereon, a tool adapted to relieve portions of a cylindrical surface on work mounted on said spindle, means to actuate said tool radially twice during each revolution of said work, and cam means to successively advance said tool radially with each revolution of the work spindle.

4. A lathe comprising in combination, a base, a work supporting and rotating spindle thereon, a tool adapted to relieve portions of a cylindrical surface on work mounted on said spindle, means to actuate said tool radially twice during each revolution of said work, said means being rotated at the same speed as the work spindle, and cam means to advance said tool radially with each revolution of the work spindle.

5. A lathe comprising in combination, a base, a work supporting and rotating spindle thereon, a plurality of tools adapted to operate adjacent said spindle, a main cam shaft having a plurality of cams thereon to operate said tools, a tool adapted to relieve portions of a cylindrical surface on work mounted on said spindle, a shaft adapted to rotate at the same speed as said spindle having means thereon to actuate said tool radially twice during each revolution of said work, and means on said main cam shaft to advance said tool radially with each revolution of the work spindle.

6. A lathe comprising in combination, a base, a work supporting and rotating spindle thereon, a plurality of tools adapted to operate adjacent said spindle, a tool mounted on an oscillating arm adapted to relieve portions of a cylindrical surface on work mounted on said spindle, means to oscillate said tool carrying arm to advance said tool radially twice during each revolution of said work, and means to advance said tool radially with each revolution of the work spindle.

7. A lathe comprising in combination, a base, a work supporting and rotating spindle thereon, a tool adapted to relieve portions of a cylindrical surface on work mounted on said spindle, cam means to successively advance said tool radially toward the work with each revolution of the work spindle, a member driven from and rotating at the same speed as said work spindle, and means thereon comprising a drum having a rod slidably mounted in a diametral slot therein to actuate said relieving mechanism radially twice during each revolution of said work.

8. A lathe comprising in combination, a base, a work supporting and rotating spindle thereon, a tool adapted to relieve portions of a cylindrical surface on work mounted on said spindle, cam means to successively advance said tool radially toward the work with each revolution of the work spindle, a member driven from and rotating at the same speed as said work spindle, and means thereon comprising a drum having a rod slidably mounted in a diametral slot therein to actuate said relieving mechanism radially twice during a revolution of said work, the cam means to advance said tool being adapted to contact with one end of said rod.

9. A lathe comprising in combination, a base, a work supporting and rotating spindle thereon, a tool mounted on an oscillating arm adapted to relieve portions of a cylindrical surface on work mounted on said spindle, cam means to successively advance said tool radially toward the work with each revolution of the work spindle, and a member driven from and rotating at the same speed as said work spindle adapted to oscillate said arm successively with each revolution of the spindle.

10. A lathe comprising in combination, a base, a work supporting and rotating spindle thereon, an oscillating tool supporting arm pivotally supported on said base, a facing tool mounted at the free end of the supporting arm, and oscillating means for the arm comprising a peripheral cam and a member contacting with said cam and with the supporting arm.

11. A lathe comprising in combination, a base, a work supporting and rotating spindle thereon, an oscillating tool supporting arm pivotally supported on said base, a facing tool mounted at the free end of the supporting arm, means to adjust the position of said arm, and oscillating means for the arm comprising a peripheral cam and a member contacting with said cam and with the supporting arm to periodically oscillate said arm.

12. A lathe comprising in combination, a base, a work supporting and rotating spindle thereon, an oscillating tool supporting arm pivotally supported on said base, a facing tool mounted at the free end of the supporting arm, and oscillating means for the arm comprising a peripheral cam and a member interposed between said cam and arm and contacting with said cam and with the supporting arm to periodically oscillate said arm.

13. A lathe comprising in combination, a base, a work supporting and rotating spindle thereon, an oscillating tool supporting arm adjustably supported on said base, a facing tool mounted at the free end of the supporting arm so as to oscillate about a transverse horizontal axis, oscillating means for the arm comprising a peripheral cam, and a member contacting with said cam and with the supporting arm to oscillate said arm.

14. A lathe comprising in combination, a base, a work supporting and rotating spindle thereon, an oscillating tool supporting arm pivotally mounted on said base so that it may oscillate about a transverse horizontal axis, a facing tool mounted at the free end of the supporting arm, oscillating means for the arm comprising a peripheral cam mounted on a main cam shaft, and a member contacting with said cam and with the supporting arm to oscillate said tool into operative work engaging position.

15. A lathe comprising in combination, a base, a work supporting and rotating spindle thereon, a plurality of tools adapted to engage and operate on a plurality of radial faces of work mounted on said spindle, means to control the movements of said tools in a predetermined cycle comprising a main cam shaft, peripheral cams on said cam shaft, means contacting with said peripheral cams to oscillate said tools into and out of operative positions, a relieving tool adapted to contact with diametrically opposite portions of the work, and means to operate said relieving tool simultaneously with said other tools.

16. A lathe comprising in combination, a base, a work supporting and rotating spindle thereon, a shaft in said base, rotating means for rotating said shaft driven from said work spindle whereby said shaft rotates at the same speed and in the same direction as the work spindle, means slidably mounted on said shaft to oscillate a tool support each half revolution of said work spindle, and cam means to slowly advance said tool support toward the work with each successive oscillation of the relieving tool.

17. A lathe comprising in combination, a base, a work supporting and rotating spindle thereon, a shaft in said base, rotating means for rotating said shaft driven from said work spindle whereby said shaft rotates at the same speed and in the same direction as the work spindle, a main cam shaft in said base, means slidably mounted on said shaft to oscillate a tool support each half revolution of said work spindle, and an arm oscillated by means of a cam on a main cam shaft to slowly advance said tool support toward the work with each successive oscillation of the relieving tool.

18. A lathe comprising in combination, a base, a work supporting and rotating spindle thereon, a shaft in said base, rotating means for rotating said shaft driven from said work spindle whereby said shaft rotates at the same speed and in the same direction as the work spindle, a drum fixed to said shaft, means mounted on said shaft and movable diametrically through said drum to oscillate a tool support each half revolution of said work spindle, cam means to slowly advance said tool support toward the work with each successive oscillation of the relieving tool, and means to adjust the position of said tool relative to said actuating means.

19. A lathe comprising in combination, a base, a work supporting and rotating spindle thereon, a shaft in said base, rotating means for rotating said shaft driven from said work spindle whereby said shaft rotates at the same speed and in the same direction as the work spindle, a drum fixed to said shaft, means mounted on said shaft and movable diametrically through said drum on said shaft to oscillate a two-part tool support each half revolution of said work spindle, contacting with said slidable means to slowly advance said tool support toward the work with each successive oscillation of the relieving tool, and means to relatively adjust the two parts of said tool support.

20. A lathe comprising in combination, a base, a work supporting and rotating spindle thereon, a shaft in said base, rotating means for rotating said shaft driven from said work spindle whereby said shaft rotates at the same speed and in the same direction as the work spindle, means mounted on said shaft and movable diametrically through a drum on said shaft to oscillate a tool support each half revolution of said work spindle, and contacting with said slidable means to slowly advance said tool support toward the work with each successive oscillation of the relieving tool, said advancing means being slowly oscillated by separate cam means.

In testimony whereof, I hereto affix my signature.

JOHN A. DOANE.